United States Patent [19]

Numata et al.

[11] Patent Number: 4,633,709
[45] Date of Patent: Jan. 6, 1987

[54] VEHICLE TURN ANGLE DETECTING DEVICE

[75] Inventors: Koji Numata, Toyokawa; Hiroaki Tanaka, Nukata; Akira Kuno, Obu, all of Japan

[73] Assignees: Nippondenso Co., Ltd., Kariya; Nippon Soken, Inc., Nishio, both of Japan

[21] Appl. No.: 763,413

[22] Filed: Aug. 7, 1985

[30] Foreign Application Priority Data

Aug. 7, 1984 [JP] Japan ............................. 59-165477
Jun. 13, 1985 [JP] Japan ............................. 60-129003

[51] Int. Cl.$^4$ ............................................. G01C 21/00
[52] U.S. Cl. ............................... 73/178 R; 364/424; 364/443
[58] Field of Search .................... 73/178 R; 340/52 F, 340/988; 180/143, 142, 79.1; 364/424, 443, 444

[56] References Cited

U.S. PATENT DOCUMENTS

| | | | |
|---|---|---|---|
| 4,032,758 | 6/1977 | Lewis | 180/79.1 |
| 4,429,469 | 2/1984 | Tsushima et al. | 33/361 |
| 4,507,737 | 3/1985 | LaSarge et al. | 73/178 R |
| 4,514,810 | 4/1985 | Ito et al. | 73/178 R |

Primary Examiner—Donald O. Woodiel
Attorney, Agent, or Firm—Cushman, Darby & Cushman

[57] ABSTRACT

A vehicle turn angle detecting device calculates an average value $\Delta\phi$ of steering wheel rotation angle at every unit time together with a travelled distance $\Delta L$. And this device calculates a vehicle turn angle $\Delta\theta$ at every unit time by using the equation shown below. By adding the calculated turn angles $\Delta\theta$, the vehicle running direction to the standard direction can be detected.

$$\Delta\phi = K \cdot \tan\Delta\phi \cdot \Delta L$$

(K: proportional constant)

13 Claims, 7 Drawing Figures

VEHICLE TURN ANGLE DETECTING DEVICE

BACKGROUND OF THE INVENTION

1. Field of the Invention

The present invention relates to a vehicle turn angle detecting device for detecting the running direction of a vehicle.

2. Description of the Prior Art

The navigation system for a vehicle is required to have a means for surely detecting the running direction of a vehicle. Conventionally, a gyroscope, a terrestrial magnetism sensor, etc. have been employed as such a means for detecting the running direction of a vehicle. However, the gyroscope is large in size and expensive and the terrestrial magnetism sensor is liable to misoperate since the terrestrial magnetism often deforms in the vicinity of a high building.

SUMMARY OF THE INVENTION

An object of the present invention is to provide a small-sized and inexpensive vehicle turn angle detecting device.

Another object of the present invention is to provide a device for detecting the vehicle turn angle from the rotation angle of a steering wheel of a vehicle.

Still another object of the present invention is to provide a vehicle turn angle detecting device which can precisely detect the turn angle of a vehicle regardless of offset occurring in the rotation angle of the steering wheel as the time proceeds.

The vehicle turn angle detecting device of the present invention is provided with a steering wheel rotation angle detecting means, a travelled distance detecting means and a vehicle turn angle computing means.

The steering wheel rotation angle detecting means detects the rotation angle $\phi$ of a steering wheel of a vehicle and the travelled distance detecting means detects the travelled distance L of the vehicle at the steering wheel rotation angle $\phi$. The vehicle turn angle computing means computes the turn angle $\theta$ of the vehicle by using the equation as follows:

$$\theta = K \cdot \tan \phi \cdot L$$

where K is a proportional constant.

Then, the running direction of a vehicle can be detected by knowing the turn angle $\theta$ from the standard direction (e.g. the direction of north).

A vehicle turn angle detecting device further comprises a steering wheel offset detecting means for memorizing the steering wheel rotation angle $\phi$ at a vehicle straight running time, as a steering wheel offset $\phi c$. In this case, the turn angle computing means calculates the turn angle $\theta$ of the vehicle by using the following equation:

$$\theta = K \cdot \tan (\phi - \phi c) \cdot L$$

where K is a proportional constant.

BRIEF DESCRIPTION OF THE DRAWINGS

FIG. 1 is a block diagram showing the structure of the device;

FIGS. 2 and 3 are flow charts each showing the computer program;

DETAILED DESCRIPTION OF THE EMBODIMENTS

Figure 1:
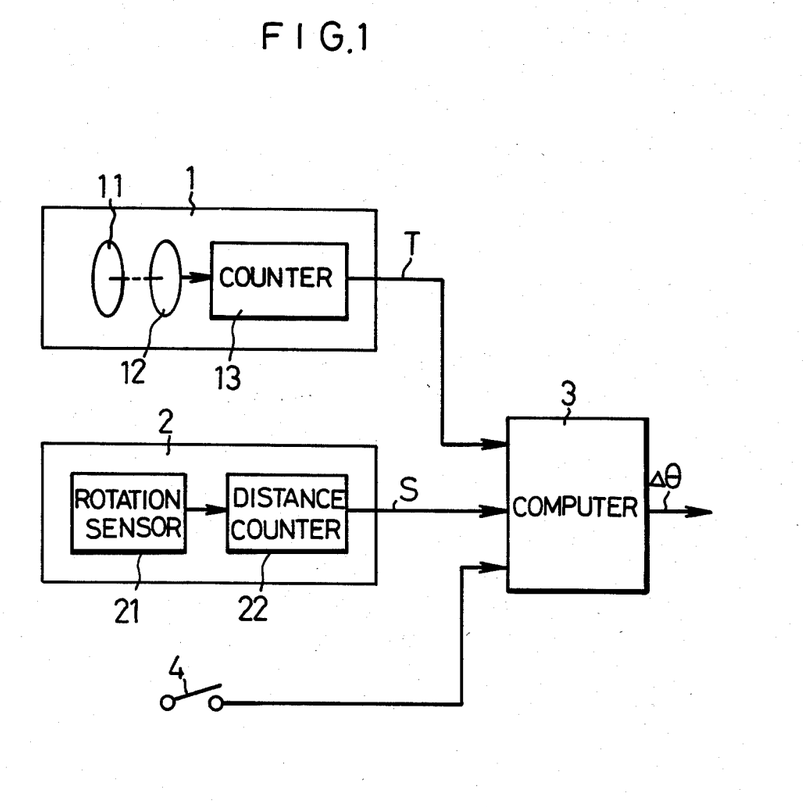
FIGS. 1 to 3 illustrate a first embodiment of a vehicle turn angle detecting device according to the present invention.
Figure 2:
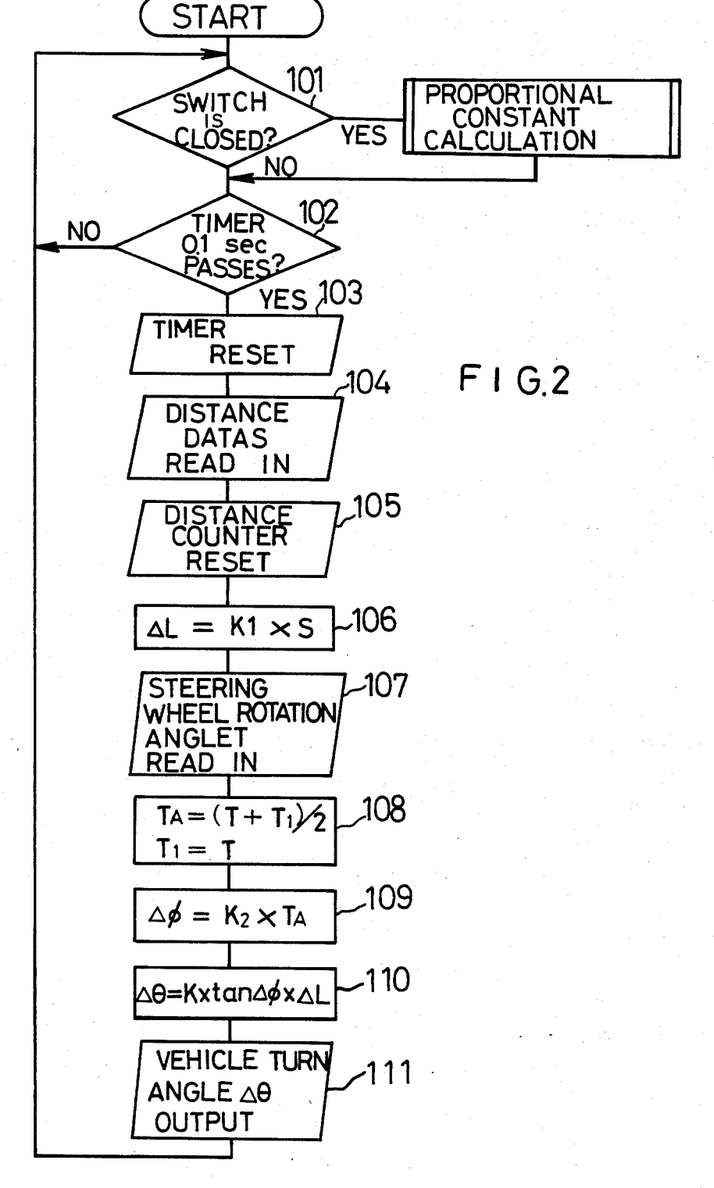
Figure 3:
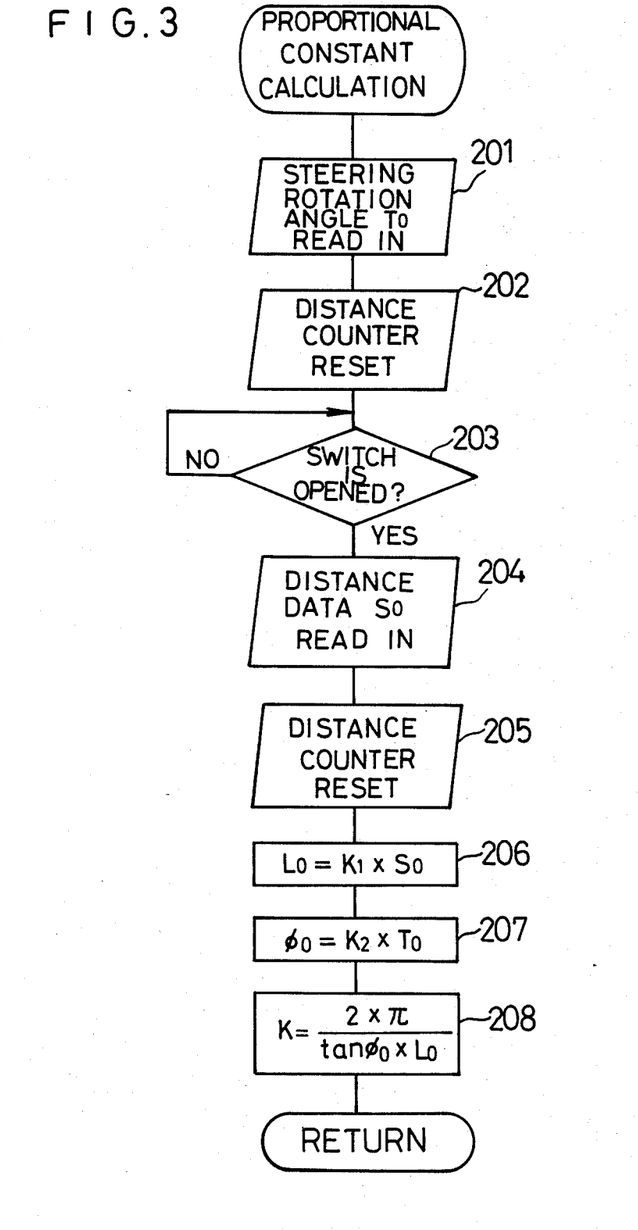

FIGS. 1 to 3 illustrate a first embodiment of the vehicle turn angle detecting device.

In FIG. 1, the reference numeral 1 indicates a steering wheel rotation angle detecting device, the reference numeral 2 indicates a travelled distance detecting circuit, the reference numeral 3 indicates a computer and the reference numeral 4 indicates a command switch for commanding the computer 3 to compute the proportional constant K as described below.

The steering wheel rotation angle detecting device 1 can be used the device disclosed in Japanese unexamined publication No. Sho 57-148262.

The steering wheel rotation angle detecting device 1 is provided with a first circular plate 11 and a second circular plate 12. In each of the circular plates 11 and 12 are formed two groups of electrodes which are arranged in the peripheral surface thereof at regular intervals and alternately connected to one another. One of the circular plates 11 and 12 is provided on the stationary side while the other one is provided on the side of a steering shaft (not shown) so that the electrodes of two plates 11 and 12 are opposed to each other.

When out-of-phase pulse signals are applied to the two groups of electrodes of the first circular plate 11, respectively, pulse signals are outputted by the two groups of electrodes of the second circular plate 12 as the steering shaft is rotated. These outputted pulse signals lead and lag in phase due to the forward and reverse rotation of the steering shaft. A counter 13 provided in the steering wheel rotation angle detecting device 1 adds or substracts the outputted pulse signals from the circular plate 12 in accordance with the phase of each of the outputted signals and outputs a steering wheel rotation angle data T. In the first embodiment, 60 pulses are outputted by each group of electrodes of the circular plate 12 at every rotation of the steering shaft.

The travelled distance detecting circuit 2 comprises a rotation sensor 21 for detecting the rotation of a speed meter cable (not shown) and generating a pulse signal having 30 pulses at every rotation of the cable, and a counter 22 for counting the pulses of the pulse signal generated by the rotation sensor 21 and generating a distance data S.

Into the computer 3 are inputted the rotation angle data T and the distance data S. The comuter 3 computes and outputs a vehicle turn angle $\Delta \theta$ in unit time in the procedure as described below.

FIG. 2 shows a flow chart of a program for obtaining the vehicle turn angle $\Delta \theta$.

The proportional constant computing routine as described below is executed when the command switch 4 (FIG. 1) is closed in Step 101.

While the command switch 4 is opened, Steps 104 to 111 are repeated every unit time of 0.1 sec. (Steps 102, 103). In Steps 104 to 106, a travelled distance $\Delta L$ in unit time is calculated and in Steps 107 to 109, an average steering wheel rotation angle $\Delta\phi$ in unit time is calculated.

Namely, in Step 104, the distance data S from the distance counter 22 is read in and in Step 105, the distance counter 22 is reset after Step 104 is executed. In Step 106, the travelled distance $\Delta L$ is obtained by multiplying the distance data S by a proportional constant $K_1$.

In the first embodiment where the speed meter cable rotates 637 times per 1000 m, the above proportional constant $K_1$ is expressed as follows:

$$K_1 = \frac{1000 \text{ (m)}}{637 \text{ (rotations)} \times 30 \text{ (pulses)}} \approx 0.052$$

In Step 107, the steering wheel rotation angle data T from the counter 13 is read in. In Step 108, an average rotation angle data TA of the newly detected rotation angle data T and the previous rotation angle data $T_1$ is calculated and the rotation angle data T is memorized as a rotation angle data $T_1$. In Step 109, an average steering wheel rotation angle $\Delta\phi$ is obtained by multiplying the average rotation angle data TA by a proportional constant $K_2$. In this case, the proportional constant $K_2$ is expressed as follows:

$$K_2 = \frac{2\pi}{60 \text{ (pulses)}} \approx 0.105$$

In Step 110, the vehicle turn angle $\Delta\theta$ in unit time is calculated from the travelled distance $\Delta L$ and the average steering wheel rotation angle $\Delta\phi$ by using the following equation and then the calculated vehicle turn angle $\Delta\theta$ is outputted in Step 111.

$$\Delta\theta = K \cdot \tan \Delta\phi \cdot \Delta L$$

Hereinafter, the above equation will be explained.

Figure 7:
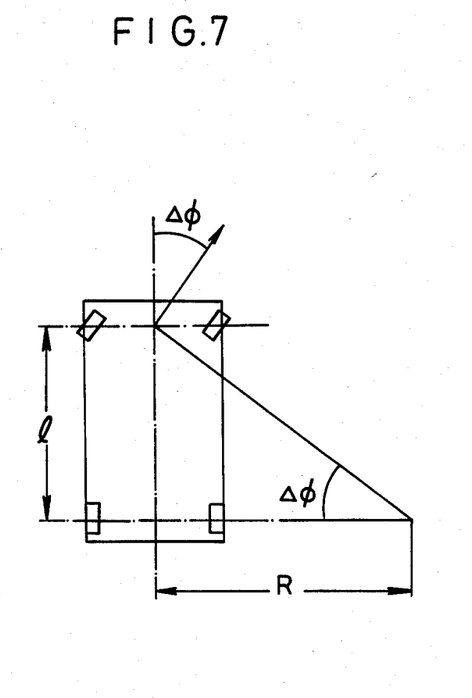
FIG. 7 is a schematic plan view of a vehicle, showing the principle of the present invention.

When a vehicle turns, the center of the turn is positioned on a production of a rear axle (not shown) of a vehicle.

Let the steering wheel rotation angle, the radius of turn and the wheel base be $\Delta\phi$, R and l, respectively as shown in FIG. 7, the following relation can be obtained:

$$\tan \Delta\phi = l/R \quad (1)$$

The arc $\Delta L$ along which the vehicle turns is related to the radius of turn R and the turn angle $\Delta\theta$ as follows:

$$\Delta L = R \cdot \Delta\theta \quad (2)$$

By substituting the equation (1) into that (2), the following equation can be obtained;

$$\Delta\theta = (1/l) \tan \Delta\phi \cdot \Delta L \quad (3)$$

where 1/l is a constant and can be replaced by K.

The equation (3) can be also expressed by the following equation:

$$\Delta\theta \approx K \cdot \Delta\phi \cdot \Delta L$$

since $\Delta\phi$ is expressed by the equation:

$$\Delta\phi \approx \tan \Delta\phi$$

in case that $\Delta\phi$ is smaller than 1.

The above proportional constant K is determined by a computing routine as shown in FIG. 3.

In this case, a vehicle is positioned on a start line after the steering wheel thereof is previously rotated so that the vehicle has a proper radius of turn.

When the command switch 4 is closed, the computing routine is started. At first, an initial steering wheel rotation angle data To is read in (Step 201) and then the distance counter 22 (FIG. 1) is reset (Step 202).

Next, the vehicle is run by one turn in this state and is returned to the start line.

When the command switch 4 is opened (Step 203), a distance data So generated by the counter 22 when the vehicle runs by one turn is read in (Step 204) and then the distance data So is reset (Step 205). In Steps 206 and 207, a travelled distance Lo and a steering wheel rotation angle $\phi$o are calculated from the above distance data So and steering wheel rotation angle data To, respectively. And in Step 208, the proportional constant K is calculated by using the equation:

$$K = 2\pi/\tan \phi o \cdot Lo$$

By integrating the vehicle turn angle $\Delta\theta$ at every unit time calculated by the above procedure, the amount of turn of a vehicle from the standard direction (e.g. north direction), namely the vehicle running direction can be detected.

Furthermore, the vehicle turn angle $\Delta\theta$ at every unit time, that is angular velocity, or centripetal acceleration calculated from the angular velocity is used as an information for controlling the run of the vehicle.

In the first embodiment, the vehicle turn angle $\Delta\theta$ was calculated at every unit time. Instead, the above claculation may be effected at every unit travelling distance.

In addition, in calculating the proportional constant K, the vehicle need not be run by one turn. It is sufficient to run the vehicle by a predetermined turn angle $\theta$o.

The proportional constant K can be also calculated by using the equation:

$$K = 1/\tan (\pi \cdot Nk) Rk$$

where Rk is the minimum radius of turn of a vehicle and Nk is the maximum number of rotation of the steering wheel of the vehicle. However, it is difficult to measure Rk and Nk with accuracy. As compared with this calculation method, that described in the first embodiment is accurate and practical.

As described above, the vehicle turn angle detecting device of the present invention can easily and accurately detect the vehicle turn angle from the steering wheel rotation angle and the vehicle travelled distance at the above steering wheel rotation angle. The device of the present invention is compact in structure and is inexpensive in production cost.

Figure 4:
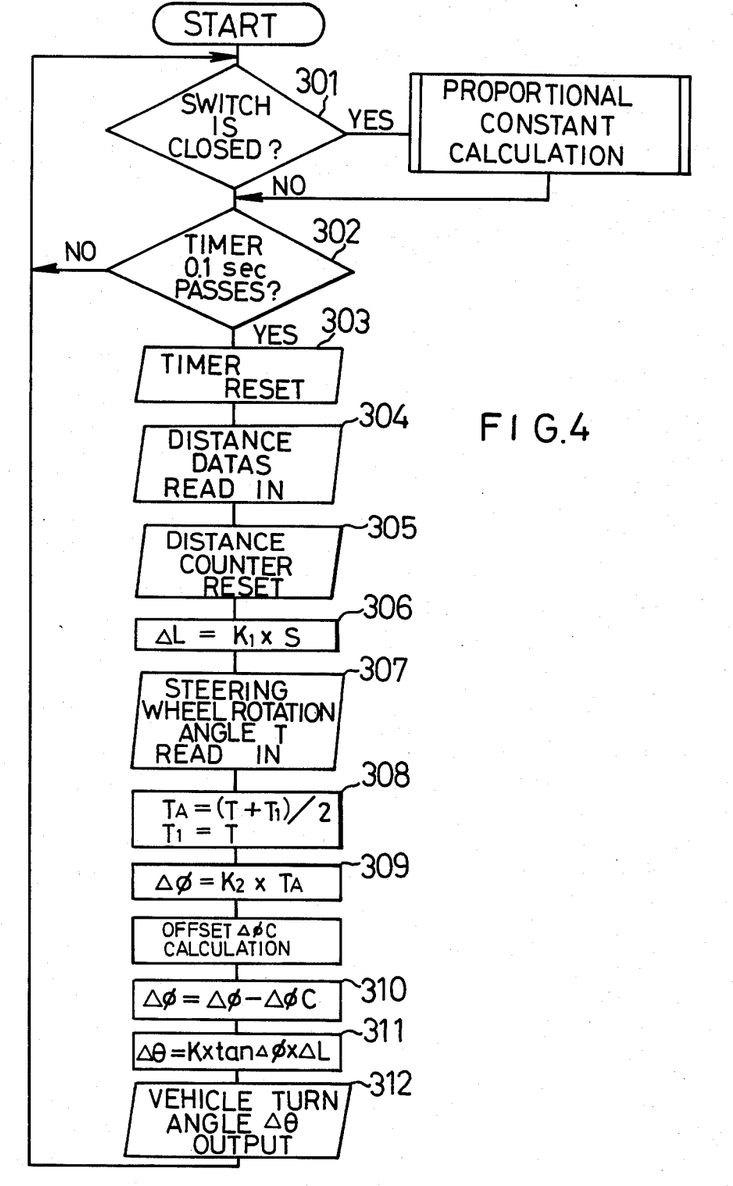
FIGS. 4 to 6 are flow charts each showing the computer program of a second embodiment of a vehicle turn angle detecting device according to the present invention.
Figure 5:
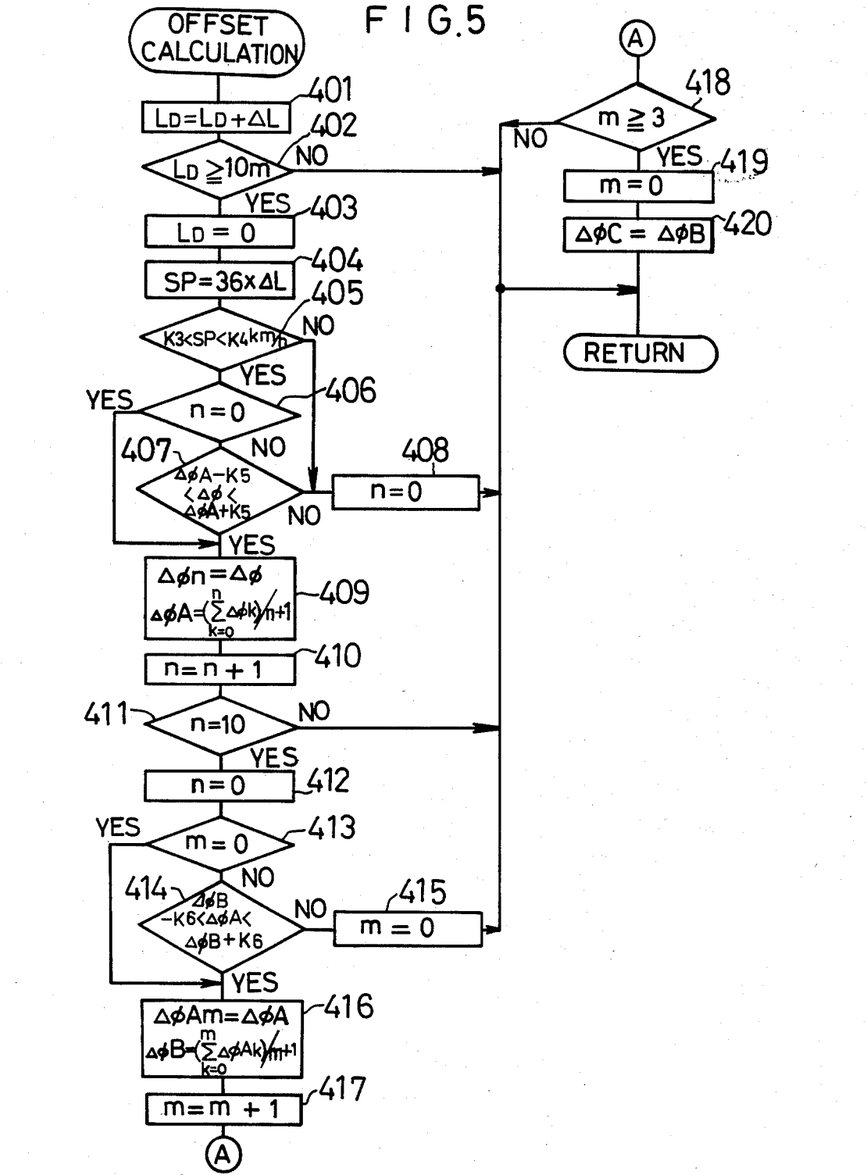
Figure 6:
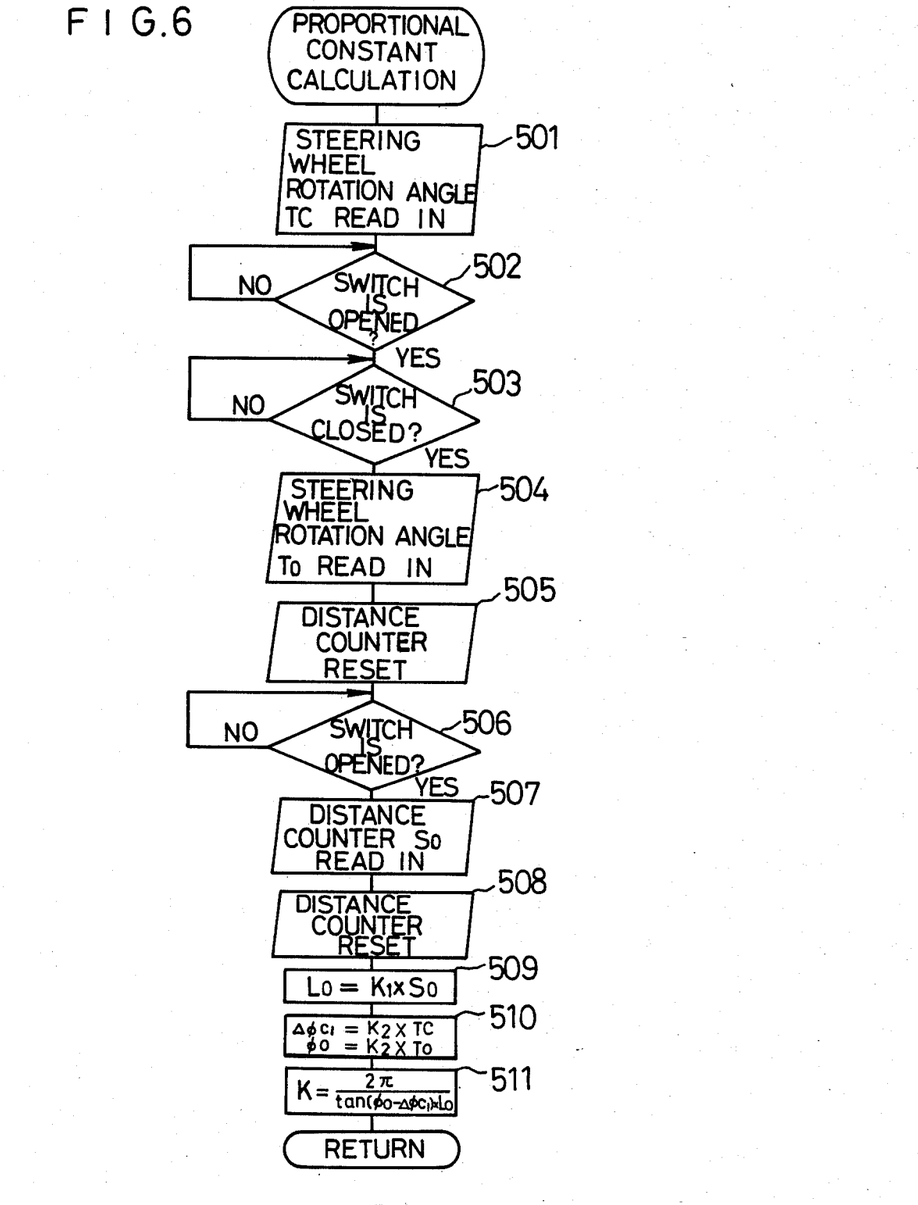

FIGS. 4 to 6 are program flow charts of the computer 3 (FIG. 1) in a second embodiment of the vehicle turn angle detecting device according to the present invention.

According to the second embodiment, based on the fact that offset sometimes occurs in the steering wheel rotation angle in the vehicle straight running state from the initial angle as the time proceeds, the vehicle turn angle can be detected more accurately by detecting the above described offset.

Steps 301 to 309 of FIG. 4 are the same with Steps 101 to 109 of the first embodiment.

In the second embodiment, the offset detecting routine described below is executed after Step 309 to obtain an offset $\Delta\phi c$. In Step 310, the steering wheel rotation angle $\Delta\phi$ is corrected by the offset $\Delta\phi c$ and in Steps 311 and 312 the vehicle turn angle $\Delta\theta$ is calculated from the corrected steering wheel rotation angle $\Delta\phi$ and is outputted.

FIG. 5 is a program flow chart of the offset detecting routine. In Step 401 of the offset detecting routine, a number of travelled distances $\Delta L$, each being measured at each unit time, are added and in Step 402, the routine beginning from Step 403 is executed every time the added value L exceeds 10 m. In Step 403, the added value $L_D$ is cleared and in Step 404, instantaneous vehicle speed SP(km/h) is calculated.

When the vehicle speed SP is within a predetermined speed range (Step 405) and when the counter n is not 0 (Step 406), the detection whether the steering wheel rotation angle $\Delta\phi$ is within a predetermined angle range or not is effected in Step 407. The constants $K_3$ and $K_4$ in Step 405 are 40(km/h) and 60(km/h), respectively and the constant $K_5$ in Step 407 is $0.05\pi$. $\Delta\phi A$ used in Step 407 is an average value of the steering wheel rotation angles within the above described predetermined angle range, which is calculated in Step 409.

When the instantaneous vehicle speed SP or the steering wheel rotation angle $\Delta\phi$ is not within the above described range, the counter n is cleared in Step 408.

Steps 403 to 409 are repeated 10 times (Steps 410, 411) to obtain the average steering wheel rotation angle $\Delta\phi A$ while the vehicle runs straight.

In Steps from 412, an average value $\Delta\phi B$ of the successively obtained average steering wheel rotation angle $\Delta\phi A$ is calculated. Namely, in Step 412 the counter n is cleared and when the counter m is not 0 (Step 413) the detection whether the average steering wheel rotation angle $\Delta\phi A$ is within a predetermined range or not is effected in Step 414. The constant $K_6$ in Step 414 is $0.05\pi$ and $\Delta\phi B$ used therein is an average value of the successively obtained average steering wheel rotation angle $\Delta\phi A$ within the above described range, which is calculated in Step 416.

When the above described rotation angle $\Delta\phi A$ is not within the above described range, the counter m is cleared in Step 415.

Steps 412 to 416 are repeated 3 times (Steps 417, 418) to obtain the average steering wheel rotation angle $\Delta\phi B$. In Step 419, the counter m is cleared and in Step 420, the above described average steering wheel rotation angle $\Delta\phi B$ is made into the steering wheel offset $\Delta\phi C$.

In the above described procedure, the steering wheel offset $\Delta\phi C$ is obtained form the average value $\Delta\phi B$ of the steering wheel rotation angles $\Delta\phi$, each being obtained at every unit time while the vehicle runs straight.

In the second embodiment, by calculating the average value $\Delta\phi A$ of ten steering wheel rotation angles $\Delta\phi$ and then calculating the average value $\Delta\phi B$ of three average values $\Delta\phi A$, the steering wheel offset $\Delta\phi C$ is obtained since the straight running condition of the vehicle sometimes does not continue for a time long enough to calculate the average value of thirty rotation angles $\Delta\phi$ at one time.

Furthermore, in the second embodiment, the calculation of the steering wheel offset $\Delta\phi C$ is performed only when the vehicle speed SP is not less than 40 km/h and not more than 60 km/h since the frequency that the vehicle runs straight in the above described speed range, is high.

FIG. 6 is a program flow chart of the proportional constant calculating routine. At first, the vehicle is made into a straight running condition and a steering wheel rotation data Tc in this condition is read in in Step 501. The closed command switch 4 (FIG. 1) is opened for a while (Step 502). Then, the steering wheel is rotated so that the vehicle has a proper radius of turn and thereafter the vehicle is positioned on the start line and the command switch 4 is closed again (Step 503). The steering wheel rotation angle data To at this time is read in (Step 504) and then the distance counter 22 is reset (Step 505).

Next, when the command switch 4 is opened again (Step 506) after the vehicle is run by one turn and is returned to the start line, the distance data So from the counter 22 is read in (Step 507).

In Step 508, the distance counter 22 is reset and in Steps 509 and 510, the travelled distance Lo, the steering wheel rotation angle $\phi o$, and an initial steering wheel offset $\Delta\phi C1$ is calculated from the distance data So and the steering wheel rotation angle data Tc and To, respectively.

And thereafter the proportional constant K is calculated from Lo, $\phi o$ and $\Delta\phi C1$ in Step 511.

As described above, the vehicle turn angle detecting device of the present invention always detects the offset in the steering wheel of a straight running vehicle and corrects the steering wheel rotation angle. Therefore, the accurate vehicle turn angle can be detected.

What is claimed is:

1. A vehicle turn angle detecting device comprising:
    a steering wheel rotation angle detecting means for detecting a rotation angle $\phi$ of a steering wheel of a vehicle;
    a travelled distance detecting means for detecting a travelled distance L of the vehicle at the steering wheel rotation angle $\phi$; and
    a turn angle computing means for calculating a turn angle $\theta$ of the vehicle by using the following equation: $\theta = K \cdot \tan \phi \cdot L$ where K is a proportional constant.

2. A vehicle turn angle detecting device according to claim 1, wherein said steering wheel rotation angle detecting means comprises a pulse signal generator for generating pulse signals at every predetermined rotation angle of a steering shaft and a counter for adding and subtracting the pulse signals generated by said pulse signal generator in accordance with the forward and the reverse rotation of said steering shaft thereby to output a count value as a rotation angle data T; and said steering wheel rotation angle detecting means calculates the steering wheel rotation angle $\phi$ by using the following equation: $\phi = K_2 T$ where $K_2$ is a proportional constant.

3. A vehicle turn angle detecting device according to claim 2, wherein said steering wheel rotation angle detecting means calculates an average value $\Delta\phi$ of the steering wheel rotation angle in unit time.

4. A vehicle turn angle detecting device according to claim 3, wherein said steering wheel rotation angle detecting means calculates the average value $\Delta\phi$ of the steering wheel rotation angle from an average value of a rotation angle data at the start of the unit time and another rotation angle data at the start of the following unit time.

5. A vehicle turn angle detecting device according to claim 3, wherein said travelled distance detecting means calculates a travelled distance $\Delta L$ in the unit time and said turn angle computing means calculates a turn angle $\Delta\theta$ in the unit time by using the following equation:

$$\Delta\theta = K \cdot \tan \Delta\phi \cdot \Delta L.$$

6. A vehicle turn angle detecting device according to claim 2, wherein said steering wheel rotation angle detecting means calculates an average value $\Delta\phi$ of the steering wheel rotation angle in unit travelled distance.

7. A vehicle turn angle detecting device according to claim 1, wherein said travelled distance detecting means comprises a rotation sensor for generating pulse signals at every predetermined rotation angle of a speed meter cable and a counter for adding the pulse signals generated by said rotation sensor, thereby to output a count value as a distance data S; and said travelled distance detecting means calculates the travelled distance L by using the following equation: $L = K_1 \cdot S$ where $K_1$ is a proportional constant.

8. A vehicle turn angle detecting device according to claim 1, wherein said turn angle computing means calculates the proportional constant k from a travelled distance Lo obtained when the vehicle is turned by a predetermined vehicle turn angle $\theta o$ at a constant steering wheel rotation angle $\phi o$ by using the following equation:

$$K = \theta o / \tan \phi o \cdot Lo.$$

9. A vehicle turn angle detecting device according to claim 1, wherein said turn angle computing means calculates the proportional constant K from the minimum radius of turn of the vehicle Rk and the maximum number of rotation of the steering wheel Nk by using the following equation:

$$K = 1/\tan (\pi \cdot Nk) \cdot Rk.$$

10. A vehicle turn angle detecting device according to claim 1, wherein said turn angle computing means calculates the turn angle $\theta$ by using the following equation:

$$\theta = K \cdot \phi \cdot L$$

when the rotation angle $\phi$ is smaller than 1.

11. A vehicle turn angle detecting device comprising:
a steering wheel rotation angle detecting means for detecting a rotation angle $\phi$ of a steering wheel of a vehicle;
a travelled distance detecting means for detecting a travelled distance L of the vehicle at the steering wheel rotation angle $\phi$:
a steering wheel offset detecting means for memorizing the steering wheel rotation angle $\phi$ at a vehicle straight running time, as a steering wheel offset $\phi C$; and
a turn angle computing means for calculating a turn angle $\theta$ of the vehicle by using an equation as follows:

$$\theta = K \cdot \tan (\phi - \phi C) \cdot L$$

where K is a proportional constant.

12. A vehicle turn angle detecting device according to claim 11, wherein said steering wheel rotation angle detecting means calculates an average value $\Delta\phi$ of the steering wheel rotation angle $\phi$ at every unit time; said travelled distance detecting means calculates a travelled distance $\Delta L$ in each unit time; said steering wheel offset detecting means averages the average value $\Delta\phi$ at every unit travelled distance while the vehicle runs straight to obtain a steering wheel offset $\Delta\phi C$ and memorizes the steering wheel offset $\Delta\phi C$; and said turn angle computing means calculates a turn angle $\Delta\theta$ in each unit time by using the following equation:

$$\Delta\theta = K \cdot \tan (\Delta\phi - \Delta\phi C) \cdot \Delta L$$

where K is a proportional constant.

13. A vehicle turn angle detecting device according to claim 11, wherein said steering wheel offset detecting means detects the newly detected average steering wheel rotation angle $\Delta\phi$ as the steering wheel rotation angle at a vehicle straight running time when a vehicle speed is within a predetermined speed range and the newly detected average steering wheel rotation angle $\Delta\phi$ is within a predetermined angle range to the precedently detected average steering wheel rotation angle $\Delta\phi$.

* * * * *